United States Patent [19]

Mercer

[11] 4,305,499

[45] Dec. 15, 1981

[54] DEVICE FOR HOLDING A NUMBER OF CONTAINERS AND PACK COMPRISING THE SAME

[75] Inventor: Frank B. Mercer, Blackburn, England

[73] Assignee: P.L.G. Research Limited, Blackburn, England

[21] Appl. No.: 129,666

[22] Filed: Mar. 12, 1980

[30] Foreign Application Priority Data

Mar. 13, 1979 [GB] United Kingdom ............... 08714/79

[51] Int. Cl.³ ...................... B65D 85/62; B65D 75/00
[52] U.S. Cl. ..................................... 206/150; 53/441; 206/805; 206/427; 294/87.2
[58] Field of Search ............... 206/150, 432, 427, 497, 206/805; 229/DIG. 12; 53/441; 294/87.2

[56] References Cited

U.S. PATENT DOCUMENTS

| | | | |
|---|---|---|---|
| 3,084,792 | 4/1963 | Poupitch | 206/150 |
| 3,386,876 | 9/1968 | Wyckhoff | 206/150 |
| 3,504,790 | 4/1970 | Owen | 294/87.2 |
| 3,733,100 | 5/1973 | Tanzer | 294/87.2 |
| 3,874,502 | 4/1975 | Weaver | 206/150 |
| 3,966,044 | 6/1976 | Cunningham | 206/427 |
| 4,116,331 | 9/1978 | Curry et al. | 206/432 |

Primary Examiner—William T. Dixson, Jr.
Attorney, Agent, or Firm—Holman & Stern

[57] ABSTRACT

The plastics material device has a plurality of generally quadrilateral openings for receiving and gripping the containers. The openings have their sides formed by strips and each of the strips of two opposite, corresponding sides of each opening are orientated along their length, the strips of the remaining two opposite sides not being substantially orientated. The strips, at least, have substantial elasticity.

14 Claims, 7 Drawing Figures

DEVICE FOR HOLDING A NUMBER OF CONTAINERS AND PACK COMPRISING THE SAME

BACKGROUND OF THE INVENTION

Various devices are known for holding a plurality of containers together. In general, the containers should be held tightly together whilst not being allowed to come into actual contact. In one instance, a bottle combining unit holding four or six bottles of beer in a firm state has been made using cardboard overwraps. In another instance (see for example U.S. Pat. No. 3,733,100), unorientated plastics sheet material has had circular openings punched into it for receiving and gripping beer cans; the openings' margins lip up with localised stretching thereof.

U.K. Pat. No. 982 036 and U.S. Pat. No. 3,386,876 do not relate to holding containers together, but disclose a uniaxially and biaxially orientated mesh structures. Although the openings in the biaxially orientated structure are roughly square, the openings in the uniaxially orientated structure are oblong and too long conveniently to hold the normal circular section bottles or cans.

The verb "orientate" as used herein means "molecularly orientate" and derived words such as "unorientated" and "orientated" have equivalent meanings.

THE INVENTION

According to the invention, the containers are held together by an integral piece of plastics material having generally quadrilateral openings each having its sides defined by a pair of orientated first strips under tension which have substantial elasticity and which will have twisted so that their centre parts lie flat against the container, and a pair of second strips which are not substantially elastic. The holding device, which is the piece of plastics material, also forms part of the invention.

Using the invention, the containers can be held together very firmly but prevented from touching each other at the location of the device. It has been found that the generally quadrilateral openings and the strips (which will be wider than they are thick) can cause the majority or almost all of the plastics material of the device to be put under tension and stretched elastically at least to some extent (though some plastic deformation may also occur) when the containers are inserted, provided the openings are correctly sized. Thus when the device is forced over the containers, the elastic strips are easily deformed to fit snugly around the container and two opposite strips will twist so that their centre parts lie flat against the container (instead of merely lipping up). It is believed advantageous to avoid orientating two opposite sides of the openings because the unorientated plastics material gives added stability to the eventual pack. When the devices are in the form of a continuous band, the procedure can be facilitated by putting the band under longitudinal tension and the longitudinal strips will take up the curvature of the container sides and whilst doing so apply tension to the transverse strips, which may themselves be subjected to very little extension.

It is stated herein that certain of the strips have substantial elasticity. This means that when they are stretched to a small extent, e.g. to produce an extension of the order of 5%, and held stretched to that extent, a substantial or high force must be applied and continue to be applied. Considerable plastic (i.e. non-elastic) deformation is tolerable as long as sufficient elastic deformation also occurs. Furthermore the elastic force applied after extension has occured may decrease somewhat. The intention is that the elastic force applied by the strips should hold the pack of containers rigidly together when the containers have been inserted in the openings. The plastics material must be chosen accordingly.

Although the elasticity of plastics material, both unorientated and orientated, varies significantly from material to material, these properties are easily ascertainable. It is found that a low density polyethylene such as "Sclair" (Trade Mark), manufactured by Du Pont of Canada, is suitable and exhibits better elastic properties after orientation than it does before orientation.

The plastics material device can be of light weight and of very low cost. The low cost enables two such devices to be used without excessive expenditure; for instance in the case of beer bottles, one device can be towards the top of the bottles and the other towards the base. However it would be possible to use just one device in suitable circumstances, for instance when holding beer cans together.

The device of the invention can be made by uniaxially stretching a starting material having a pattern of holes or depressions.

The starting material is preferably not orientated, though melt orientation may have occurred. If the initial holes are formed by punching, the punched-out pieces are smaller than they would be if the device were formed by direct punching of preorientated material, and the punched-out pieces are not orientated, which facilitates both punching and reclaiming the plastics material. Theoretical considerations and further details such as possible shapes of the holes or depressions are given in copending Application Ser. No. 82,523 by the present Applicant, filed Oct. 9, 1979 under the title "Plastics Material Mesh Structure".

The starting sheet material can be of any thickness, including low thicknesses which are normally referred to as films; furthermore, though the sheet material is preferably planar on each face, this is not necessarily so. If depressions, rather than holes, are formed in the starting material for the method, the depressions must be such that they rupture when the material is stretched.

The strips need not be parallel-sided, though substantially parallel-sided strips are preferred.

DESCRIPTION OF PREFERRED EMBODIMENTS

The invention will be further described, by way of example, with reference to the accompanying drawings, in which.

Figure 1:
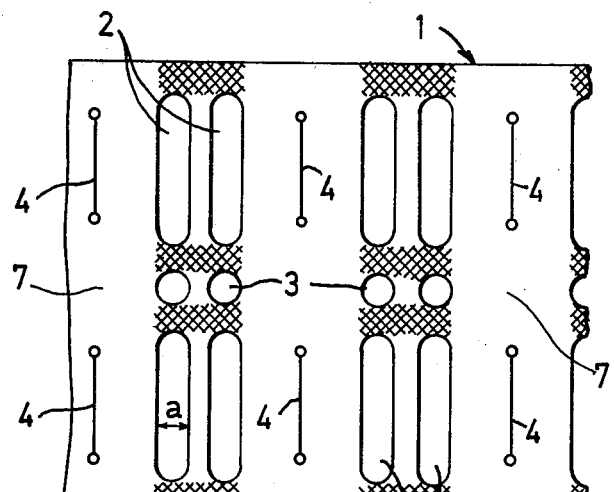
FIG. 1 is a plan view of part of some starting material for a method in accordance with the invention.

Though many different plastics materials and different thicknesses can be used, the starting material 1 shown in FIG. 1 can be of low density polyethylene (say 0.918 gm/cc.) and have a thickness of about 0.5 mm. The starting plastics material can have some elasticity, and is preferably unorientated. As can be seen, the plastics sheet material 1 has groups of four main holes 2 whose centres are on a rectangular grid. The main holes 2 are long-shaped with their major axes at right angles to the longitudinal or machine direction, which runs across the page. In the transverse direction, there is a further hole 3 between each pair of main holes 2, and its transverse dimension is substantially less than that of the main holes 2. Each group of main holes 2 is separated from the next group by holes or (as shown) slits 4 which have circular holes at each end to prevent splitting. In general, the holes or slits 4 should be long-shaped with their major axes in the transverse direction. The holes or slits 2, 3 and 4 can be formed by punching or in any other suitable manner, or could be merely depressions.

The sheet material 1 is in the form of a long band, and the band is stretched in the machine direction (indicated by the double-headed arrow in FIG. 1) in any suitable manner. In practice, the stretching can be effected in a hot water bath using differential speed rolls. The stretch ratio can be chosen in accordance with the plastic used and the strength required, but suitable stretch ratios are for instance between 1:5 and 1:8, as measured across the holes, i.e. comparing the dimension a in FIG. 1 with the dimension A in FIG. 2. During this stretching, the zones at the sides of the holes 2, 3 are orientated and drawn into longitudinal strips 5. For clarity, these zones are shown cross-hatched in FIG. 1. It will be seen that the zones between the slit-shaped holes 4 and on the outside of the slit-shaped holes 4 are not stretched.

Figure 2:
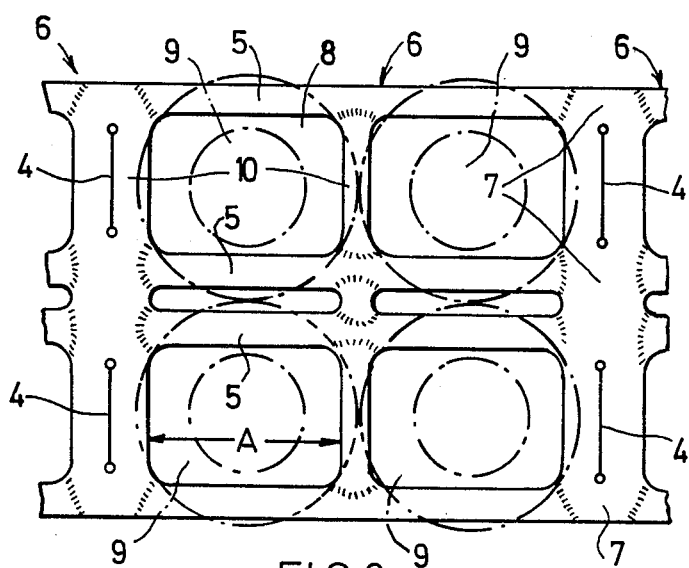
FIG. 2 is a plan view of part of a band of container holding devices in accordance with the invention, the positions of the containers being indicated.

Looking at FIG. 2, which shows the stretched band, the band is formed of an integral succession of devices 6 for holding a plurality of containers together. In the instance shown, four containers are to be held together, but it can be seen that with simple modification, two containers or six containers or other suitable numbers could be held together. The devices 6 are joined to each other by parts 7 in the line of the slits 4.

Figure 3:
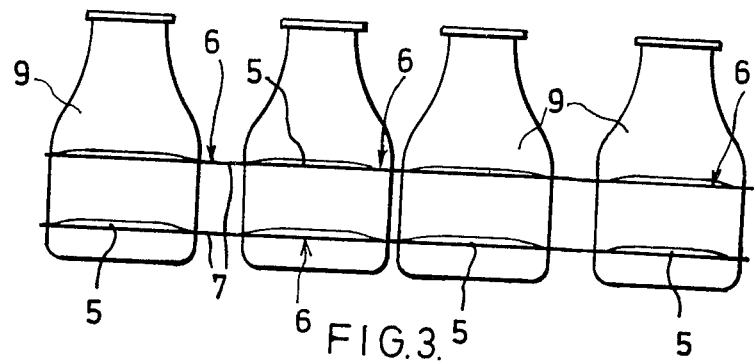
FIG. 3 is a plan view of container packs made using the devices of FIG. 2.

In each device there is a plurality of generally quadrilateral openings 8 on a rectangular or square grid, which have been formed from the main holes 2 and which are for receiving and gripping the respective containers, shown as squat beer bottles 9 in FIG. 3. As can be seen in FIG. 2, each opening 8 has its sides formed by strips, the longitudinal strips 5 being orientated along their length and the transverse strips 10 not being substantially orientated. The longitudinal strips 5 are substantially longer than the transverse strips 10. In FIG. 2, the hatching indicates where the thickness of the plastic increases on passing from orientated plastic to unorientated plastic, and the hatching lines run up the slope. It will be seen that the orientated strips 5 of one opening are aligned with the orientated strips 5 of the next opening and that the orientation passes from the end of one strip into the end of the aligned strip, in the same device 6. Furthermore, the orientation of the strips 5 continues beyond the corners of the openings 8. Orientation itself increases the strength of the plastic, and by continuing the orientation beyond the corners of the openings 8 the transition between the orientated plastic and the unorientated plastic is strengthened.

It will be seen that the orientated, longitudinal strips 5 give the band shown in FIG. 2 significant strength in the machine direction and also give the sides of the openings 8 good elastic properties. Due to their greater bulk, the unorientated, transverse strips 10 stop the bottles 9 contacting each other and clinking. The sizes of the openings 8 are such that some elastic stretching of the sides is required in order to receive the bottles 9. In general, it is believed that the longitudinal strips 5 should be extended by 2 or 3% up to 15% on inserting the bottles 9, a preferred range being 5% to 10%. The force required to hold the strips 5 so extended is a force of the order of 1 Kg wt., eg. 0.4 up to 2 Kg wt.

In theory, it would be possible to form the band shown in FIG. 2 by suitable formation of the initial holes and stretching the plastics material in two directions at right angles, either simultaneously or sequentially. This however is not preferred because it would be more difficult to produce accurately-sized openings 8 and because the transverse stretching would be expensive.

In order to pack the bottles 9, the bottles 9 are two-by-two, e.g. touching one another along a conveyor. The devices 6 are provided in the form of a continuously-moving band which is under longitudinal tension, and which can come from a roll; the band is pressed down over the tops of the bottles 9 to grip the bodies of the bottles 9. FIG. 2 generally indicates the positions of the bottles 9, before pressing the band down. Subsequently or simultaneously a second band can be pressed over the bottles 9, to grip the bodies of the bottles 9 at a position spaced from the first band. The shape of the bottles 9 shown in FIG. 3 makes it more desirable to push both bands on from the top because the relatively small diameter at the neck of the bottle 9 facilitates entry into the openings 8 of the device, and in this case both bands can be identical. However, in other cases it may be preferred to push one band on from the top and the other band from the bottom. In this latter case, it may be necessary to have the openings 8 in the lower band somewhat larger because it may be more difficult to force the lower band over the bottles as there is no tapered section to facilitate entry.

Figure 4:
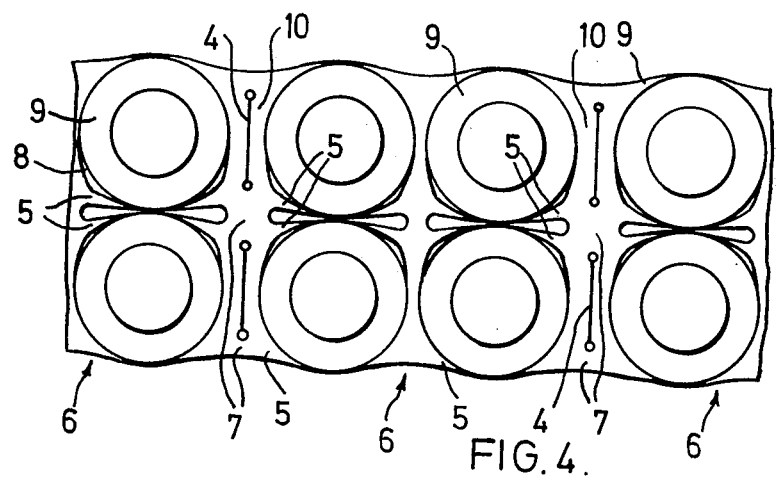
FIG. 4 is a plan view of the packs of FIG. 3.

As shown in FIGS. 3 and 4, the longitudinal strips 5 twist round so that the centre part of each strip lies flat against the sides of the container. For this reason, there are two spaced, parallel strips 5 in the centre zone, though FIG. 5 shows that a single central strip 5 can be used, if desired, and the single strip 5 will twist round.

Figure 5:
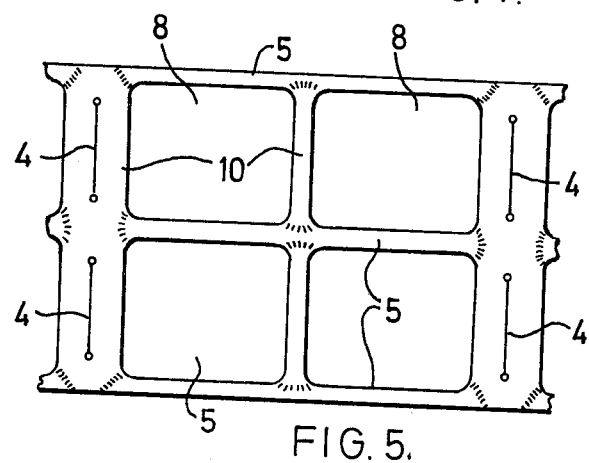
FIG. 5 is a plan view of part of another band of container holding devices in accordance with the invention.

Preferably, the outer strips 5 have to stretch to a greater extent than the inner strip 5, to hold the pack firmly together with pairs of bottles 9 pulled towards each other and merely separated by the thickness of the two strips 5 (or just one strip 5 in the FIG. 5 device). To arrange this, the centres of the bottles 9 are slightly outside the centres of the original openings 8.

By lying flat against the sides of the bottles 9, the strips 5 hold the bottles 9 more firmly than they would if they were on their edges, and in addition the major part of the material of the band is stretched elastically; in practice one can stretch all the material except that at the corners of the device and at the intersections of the longitudinal strips 5 and transverse strips 10. FIG. 4 shows a gap at the inner corners of each opening 8 but not at the outer corners, and this is preferred. However, there could also be gaps at the outer corners or alternatively no gaps at all. The individual packs can subsequently be parted by slitting along the parts 7. In the final pack, all the strips 5, 10 are under tension in the direction of their length.

If desired, a U-fold (not shown) can be formed in the central longitudinal strip 5 in FIG. 5 to provide a greater thickness of material between adjacent bottles 9.

The strips 10 adjacent the slits 4 could be longer, to form handles for holding the packs or tags for carrying advertising matter.

EXAMPLE

In general this Example is a typical example for a starting material made of extruded, unorientated "Sclair" having a uniform thickness of 0.5 mm. All distances are in mm and all forces are in Kg. wt.

|  | Outer strips 5 | Inner Strips 5 |
|---|---|---|
| Strip width before stretching (distance between edges of holes 2 and 3 in Figure 1) | 9.5 | 6.4 |
| Strip width after stretching (at narrowest point) | 4.8 | 3.2 |
| Strip thickness after stretching | 0.18 | 0.20 |
| Strip length before stretching (a in FIG. 1) | 9.5 | |
| Strip length after stretching (A in FIG. 2) | 50.8 | |
| Stretch ratio | 5.3:1 | |
| Static force required to produce 5% extension | 0.75 | 0.5 |
| Static force required to produce 10% extension | 1.4 | 1.0 |
| Static force required to produce 10% extension | 1.4 | 1.0 |
| Static force required to produce 15% extension | 1.75 | 1.5 |

The forces noted above dropped by a value of from 0.1 to 0.15 Kg wt. on holding the strips 5 extended.

THE APPARATUS

Figure 6:
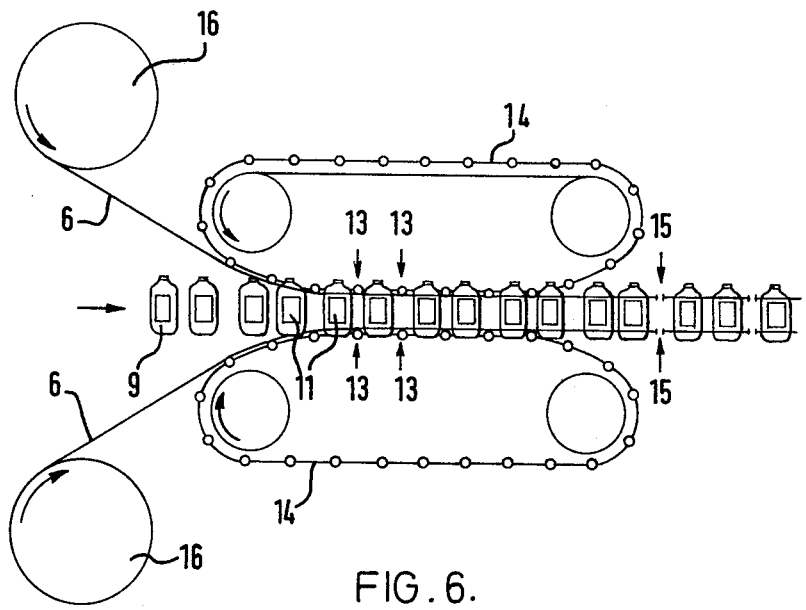
FIG. 6 is a schematic plan view of apparatus for applying the device of the invention to containers.
Figure 7:
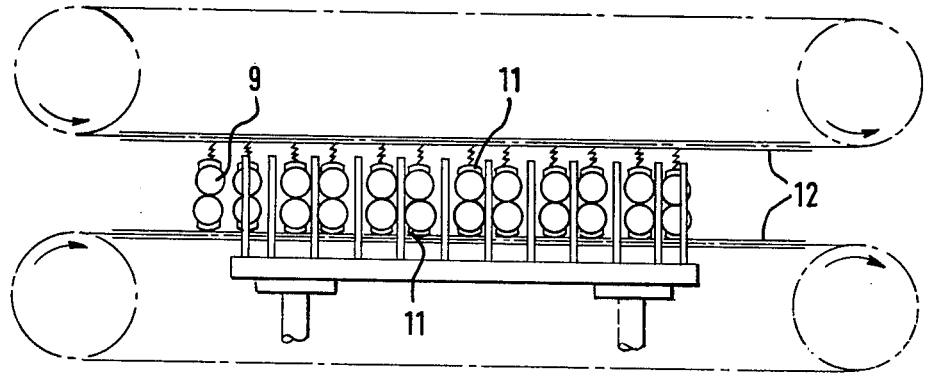
FIG. 7 is a schematic side view of the apparatus of FIG. 6.

The copending application discloses apparatus for making the devices of the invention. The devices, in band form, are applied as shown in FIGS. 6 and 7.

The bottles 9 are supported on their sides by cradles 11 carried on continuously-moving horizontal conveyors 12. Two bands of devices 6 are led at the same speed as the conveyor 12 from rolls 16 F.B.M. along either side of the bottles 9. Vertical rods 13, also moving at the same speed as the conveyor 12, are carried on chains 14. The rods 13 gradually approach a position in which the devices 6 are properly applied to the bottles 9, thereby pressing the devices 6 into their correct positions. If necessary, the bottles 9 can be clamped to prevent them slipping sideways. The packs are then cut from one another by a cutter indicated schematically at 15.

I claim:

1. A device for holding a plurality of containers together, comprising an integral piece of plastics material which has a plurality of generally quadrilateral openings for receiving and gripping respective containers, each opening having its sides defined by a pair of mutually spaced first strips and a pair of mutually spaced second strips generally at right angles to the first strips, each first strip being orientated in the direction of its length and having substantial elasticity and the second strips not being substantially orientated, and the first strips of one opening being aligned with the first strips of an adjacent opening with the orientation passing from an end of each first strip into the adjacent end of an aligned first strip.

2. The device of claim 1, wherein two adjacent openings are separated by two parallel, spaced strips.

3. The device of claim 2, wherein each separating strip is a said first strip.

4. The device of claim 2, for holding at least four containers together, and having at least four of the container receiving openings with their centres on a notional rectangular or square grid, two pairs of parallel, spaced first strips separating respective adjacent openings.

5. The device of claim 4, wherein, in the other direction, single second strips separate respective adjacent openings.

6. The device of claim 1, wherein the openings are generally rectangular, the first strips being substantially longer than the second strips.

7. A band providing an integral succession of devices each for holding a plurality of containers together, the band comprising an integral, elongate piece of plastics material which has generally quadrilateral openings spaced along its length, for receiving and gripping respective containers, each said opening having its sides defined by a pair of mutually spaced longitudinal strips and a pair of mutually spaced transverse strips, respective longitudinal strips being aligned along the length of the band and the longitudinal strips being orientated in the direction of their length and having substantial elasticity, and the transverse strips not being substantially orientated, the orientation passing from an end of each longitudinal strip into the adjacent end of an aligned longitudinal strip.

8. A method of making a device for holding a plurality of containers together, comprising forming a plurality of long-shaped holes or depressions on a notional rectangular grid in plastics sheet material which when orientated has substantial elasticity, and then stretching the material only at right angles to the major axes of the holes or depressions, to orientate, and draw into strips, zones at the sides of the holes or depressions and to form the holes or depressions into openings for receiving and gripping the containers, the stretching being continued until the orientation of each said strip passes from an end thereof into the adjacent end of an aligned said strip.

9. A pack comprising at least two containers and at least one device holding the containers together, the device comprising an integral piece of plastics material which has a plurality of originally generally quadrilateral openings receiving and gripping the respective containers, each opening having its sides defined by a pair of mutually spaced first strips under tension, and a pair of mutually spaced second strips under tension, originally generally at right angles to the first strips, the first strips being twisted so that the centre part of each first strip lies flat against the side of the respective container and the first strips being orientated in the direction of their length and having substantial elasticity while the second strips are not substantially orientated.

10. The pack of claim 9, wherein pairs of containers which are separated by at least one first strip, are pulled towards each other by the respective second strips.

11. The pack of claim 9, wherein there are two of the devices one spaced above the other and parallel to each other, each device holding all the containers together.

12. The pack of claim 9, wherein the first strips of one opening are generally aligned with the first strips of an adjacent opening with the orientation passing from an end of each first strip into the adjacent end of an aligned first strip.

13. A method of packing containers, comprising:

providing a band comprising an integral succession of devices each for holding a plurality of containers together, the band comprising an integral, elongate piece of plastics material which has generally quadrilateral openings spaced along its length, for receiving and gripping respective containers, each opening having its sides defined by a pair of mutually spaced longitudinal strips and a pair of mutually spaced transverse strips, respective longitudinal strips being aligned along the length of the band and the longitudinal strips being orientated in the direction of their length and having substantial elasticity, and the transverse strips not being substantially orientated;

inserting containers in the respective openings whereby the containers are gripped by the sides of the openings; and subsequently separating the groups of containers by dividing the band between the groups.

14. The method of claim 13, wherein the orientation passes from an end of each longitudinal strip into the adjacent end of an aligned longitudinal strip.

* * * * *